United States Patent
Lutz et al.

(10) Patent No.: US 6,782,695 B2
(45) Date of Patent: Aug. 31, 2004

(54) FUEL CONTROLLER

(75) Inventors: Phillippe Paul Robert Lutz, Great Warley (GB); Garon Nigel Heslop, Billericay (GB); Darren Montgomery, Maldon (GB); Jon Dixon, Maldon (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 10 days.

(21) Appl. No.: 10/264,642

(22) Filed: Oct. 4, 2002

(65) Prior Publication Data

US 2003/0093993 A1 May 22, 2003

(30) Foreign Application Priority Data

Oct. 4, 2001 (EP) .............................................. 01308485

(51) Int. Cl.⁷ ................................................. F01N 3/00
(52) U.S. Cl. .............................. 60/285; 60/274; 60/276; 123/103; 123/109
(58) Field of Search .......................... 60/274, 276, 285, 60/277; 701/109, 115, 103; 123/103, 109, 115

(56) References Cited

U.S. PATENT DOCUMENTS

| | | | |
|---|---|---|---|
| 5,293,740 A | | 3/1994 | Heppner et al. |
| 5,732,551 A | * | 3/1998 | Naber et al. .................. 60/274 |
| 5,842,340 A | * | 12/1998 | Bush et al. .................... 60/274 |
| 5,901,552 A | | 5/1999 | Schnaibel et al. |
| 5,930,993 A | * | 8/1999 | Kammann et al. ............. 60/274 |
| 6,202,406 B1 | * | 3/2001 | Griffin et al. ................. 60/274 |
| 6,233,922 B1 | * | 5/2001 | Maloney ....................... 60/276 |
| 6,453,665 B1 | * | 9/2002 | Bower et al. ................. 60/285 |

FOREIGN PATENT DOCUMENTS

DE 10028570 12/2000

* cited by examiner

*Primary Examiner*—Binh Q. Tran
(74) *Attorney, Agent, or Firm*—Brinks Hofer Gilson & Lione

(57) ABSTRACT

This invention relates to a method and apparatus for controlling the air-fuel ratio demanded by a fuel controller in order to maintain optimum performance of a catalytic converter. The invention provides a controller for requesting an air fuel ratio according to a switching value derived from an estimated oxygen storage value of a catalyst, in which the controller is arranged to perform the following steps a) request a maximum ratio of air to fuel when the switching value is less than a first threshold;

b) gradually decrease the requested air to fuel ratio from said maximum ratio;

c) request a minimum ratio of air to fuel when the switching value is greater than a second threshold; and d) gradually increase the requested air to fuel ratio from said minimum ratio.

12 Claims, 5 Drawing Sheets

FUEL CONTROLLER

This invention relates to a method and apparatus for controlling the air-fuel ratio demanded by a fuel controller in order to maintain optimum performance of a catalytic converter.

Three way catalytic converters are used to reduce exhaust emission of nitrous oxides ($NO_x$) hydrocarbon (HC) and carbon monoxide (CO). In a steady sate of operation the performance of the catalyst in removing these pollutants is at an optimum level when the air fuel ratio of the exhaust gas is within a narrow range, close to the stoichiometric air-fuel ratio.

Conventionally, a fuel controller is used to control the air fuel ratio demand from an engine based on feedback from an air fuel ratio sensor upstream of a catalytic converter in the exhaust passage. In other known control systems two air-fuel ratio sensors are used, one upstream of the catalytic converter, and one downstream of the catalytic converter.

In one example of such fuel control schemes, the air fuel ratio demand is increased until the air fuel ratio sensor detects that the ratio demand is too lean, whereupon the requested air fuel ratio is switched to request the stoichiometric air fuel ratio, and gradually decreased until the air fuel ratio sensor detects that the ratio demand is too rich. In other examples, when the air fuel ratio becomes too rich or too lean the requested air fuel ratio is switched to request an air fuel ratio which is half way between the maximum and minimum air fuel ratios which have caused previous switching.

This invention provides a method and apparatus for operating an improved fuel control scheme in which exhaust emission of pollutants are reduced.

According to the present invention there is provided a fuel control system comprising a first sensor arranged to measure an air fuel ratio upstream of a catalyst; a second sensor arranged to measure an air fuel ratio downstream of the catalyst; a catalyst model arranged to determine oxygen storage characteristics of the catalyst; a catalyst model arranged to estimate an oxygen storage value of the catalyst in dependence upon the measured air fuel ratio upstream of the catalyst, upon the measured air fuel ratio downstream of the catalyst and upon the determined oxygen storage characteristics of the catalyst; a controller for requesting an air fuel ratio according to a switching value derived from the estimated oxygen storage value of the catalyst, in which the controller is arranged to perform the following steps a) request a maximum ratio of air to fuel when the switching value is less than a first threshold;

b) gradually decrease the requested air to fuel ratio from said maximum ratio;

c) request a minimum ratio of air to fuel when the switching value is greater than a second threshold; and d) gradually increase the requested air to fuel ratio from said minimum ratio.

There is a time delay between changing the air fuel ratio demand, and the resulting change in the estimated oxygen storage value which means that if the air fuel ratio demand is changed due to the estimated oxygen storage value reaching a predetermined threshold then that predetermined threshold will be exceeded, or 'overshot', due to the time delay. To alleviate the problem of the time delay, in a preferred embodiment a future oxygen storage value is predicted. Accordingly the fuel control system further comprises an oxygen storage predictor arranged to perform the following steps:

estimate a future oxygen storage value of the catalyst (2) in dependence upon the estimated oxygen storage value, the determined oxygen storage characteristics and a requested air fuel ratio; and derive said switching value from the estimated future oxygen storage value.

As the catalyst ages the engine has to be run leaner to achieve a predetermined level of oxygen storage in the catalyst, and has to be run richer to achieve a predetermined level of oxygen depletion. To alleviate the problem of changing characteristics as the catalyst ages, in another embodiment of the invention, instead of controlling air fuel ratio demand using a predetermined estimated oxygen storage threshold the air fuel ratio may be controlled taking into account characteristics of the catalyst which are modelled by the catalyst model.

Therefore the oxygen storage predictor is arranged to derive said switching value from the estimated future oxygen storage value in dependence upon said oxygen storage characteristics.

Advantageously, the rate of decrease is dependant upon the difference between the switching value and the first threshold and the rate of increase is dependent upon the difference between the switching value and the second threshold.

According to another aspect of the present invention there is also provided a method of requesting an air fuel ratio according to a switching value derived from an estimated oxygen storage value of a catalyst comprising the steps of a) requesting a maximum ratio of air to fuel when the switching value is less than a first threshold;

b) gradually decreasing the requested air to fuel ratio from said maximum ratio;

c) requesting a minimum ratio of air to fuel when the switching value is greater than a second threshold; and d) gradually increasing the requested air to fuel ratio from said minimum ratio.

In a preferred embodiment said switching value is derived from an estimated future oxygen storage value, in which the estimated future oxygen storage value of the catalyst is estimated in dependence upon the estimated oxygen storage value, determined oxygen storage characteristics and a requested air fuel ratio Preferably said switching value is derived from the estimated future oxygen storage value in dependence upon said oxygen storage characteristics.

Advantageously, the rate of decrease is dependant upon the difference between the switching value and the first threshold and the rate of increase is dependent upon the difference between the switching value and the second threshold.

An embodiment of the invention will now be described, by way of example only, with reference to the accompanying drawings in which FIG. 1 is a block diagram illustrating use of a catalyst observer model;

Figure 1:
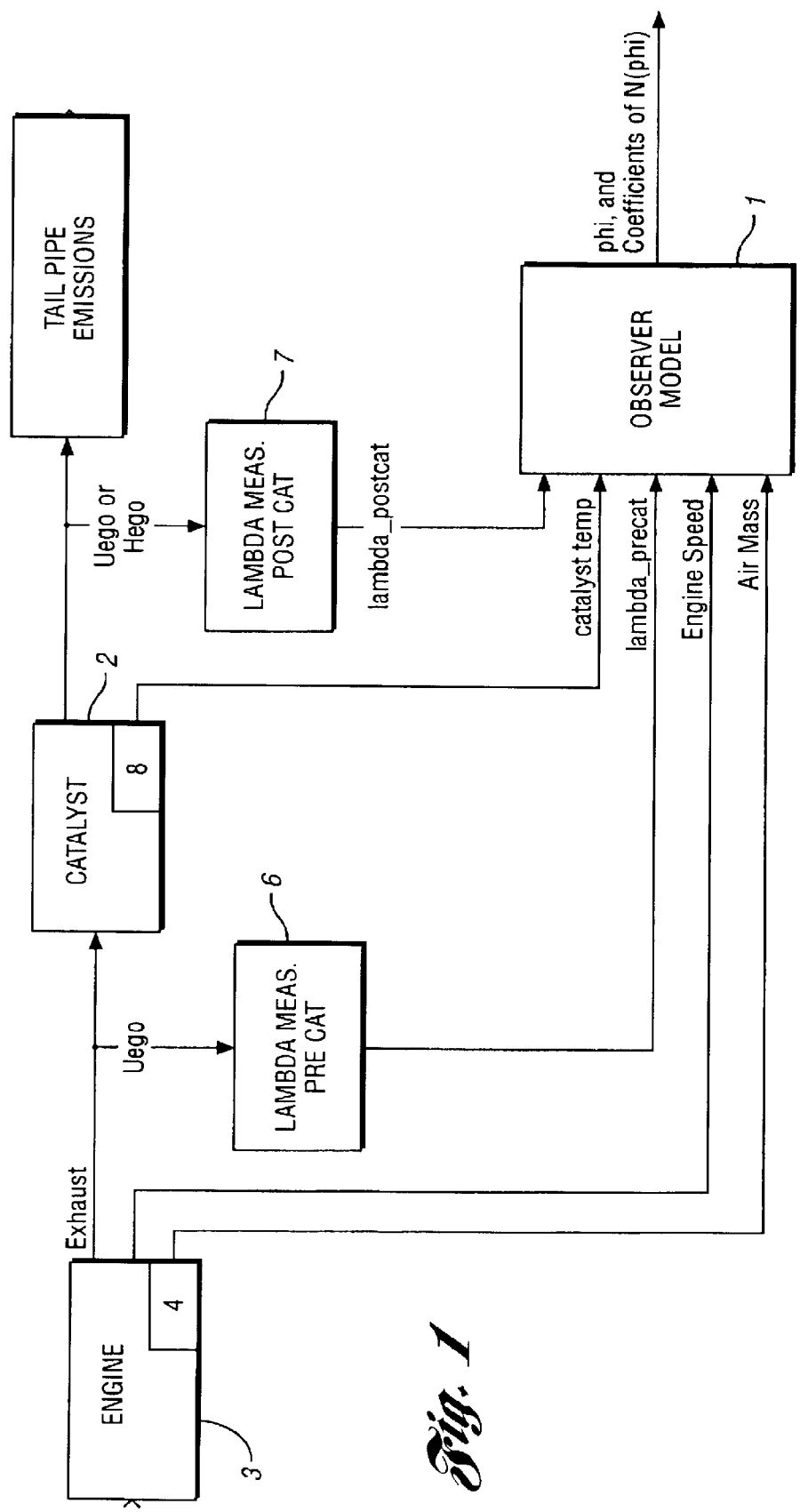

Referring now to FIG. 1, a model 1 of a catalyst 2 will be described. An air flow sensor 4 mounted in an intake pipe of an engine 3 is used to measure air mass flow induced by the engine 3. In other embodiments of the invention the air mass flow may be estimated from other parameters, for example manifold pressure, engine speed and air temperature.

Exhaust gases from the engine 3 are fed to the catalyst 2 mounted in an exhaust pipe. A sensor 6 measures the air fuel ratio upstream of the catalyst 2. A second sensor 7 measures the air fuel ratio down stream of the catalyst 2. The sensor 7 may be a Universal Exhaust Gas Oxygen (UEGO) sensor or may be a Heated Exhaust Gas Oxygen (HEGO) sensor. A HEGO sensor senses whether the air-fuel ratio is rich or lean of stoichiometric, whereas a UEGO sensor provides a measurement of the air fuel ratio. The sensor 6 is a UEGO as a precise measurement of the upstream air fuel ratio is required. A sensor 8 measures the temperature of the catalyst 2. The catalyst 2 does not perform well at low temperatures so the model 1 has the measured catalyst temperature as an input, and does not operate until the temperature of the catalyst reaches a minimum temperature. In other embodiments the catalyst temperature may be estimated using a catalyst model.

The observer model 1 operates as follows. Oxygen storage of the catalyst is represented by an oxygen storage variable $\phi$ which is equal to zero when the catalyst is in a neutral state, is negative if the catalyst is depleted of oxygen and is positive if the catalyst is oxygen rich.

The rate of change of the oxygen storage variable $\phi$ is estimated according to the following equation.

$$d\phi/dt = (\Delta\lambda_{precat} - N(\phi)S_{wv})*\text{oxygen\_mass}/\lambda_{precat}$$

A precatalyst air fuel ratio $\lambda_{precat}$ is equal to air fuel ratio which is measured at the sensor 6 divided by the stoichiometric air fuel ratio. $\Delta\lambda_{precat}$ is equal to $\lambda_{precat}-1$, therefore $\Delta\lambda_{precat}$ is negative if the air fuel ratio is rich of stoichiometric, and $\Delta\lambda_{precat}$ is positive if the air fuel ratio is lean of stoichiometric. The air mass flow measured at the sensor 4 is multiplied by a constant value 0.21 which is equal to the fraction of air by mass which is oxygen, this fraction is denoted oxygen_mass in the above equation.

Figure 2:
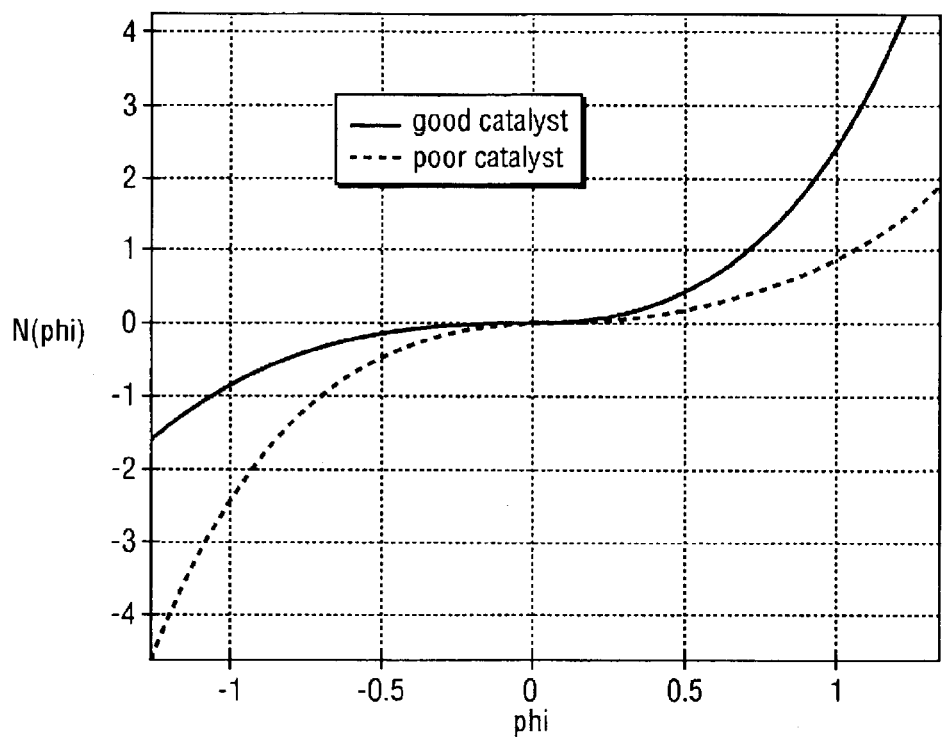
FIG. 2 is a graph showing the difference in operation between a new catalyst, and one which has deteriorated.

$N(\phi) = \Sigma a_i \phi^i$ and represents the resistance to oxygen storage of the catalyst for a particular value of $\phi$ as illustrated in FIG. 2.

$S_{wv}$ is equal to 0 when $\Delta\lambda_{precat}$ is negative i.e. the air fuel ratio is rich of stoichiometric and $\phi$ is greater than 0 i.e. there is excess oxygen stored in the catalyst.

It will be understood that when a rich air fuel ratio is supplied to the engine 3, and when there is excess oxygen stored in the catalyst 2, then the engine 3 emits gaseous components which can be oxidised by the catalyst 2, and in this case $S_{wv}$ is equal to 0 so that $$d\phi/dt = \Delta\lambda_{precat}*\text{oxygen\_mass}/\lambda_{precat}$$

However, when a lean air fuel ratio is supplied to the engine 3 or when there is no oxygen stored in the catalyst 2 then $S_{wv}$ is equal to 1 so that $$d\phi/dt = (\Delta\lambda_{precat} - N(\phi))*\text{oxygen\_mass}/\lambda_{precat}$$

so in this case $d\phi/dt$ is reduced by an amount equal to $N(\phi)*\text{oxygen\_mass}/\lambda_{precat}$ when compared to the previous case.

$$\text{Est}(\lambda_{postcat}) = N(\phi)S_{wv}+1$$

$\lambda_{postcat}$ is the downstream air fuel ratio measured by the sensor 7, divided by the stoichiometric air fuel ratio. $\phi$ is calculated by integrating the above differential equation, and then $N(\phi)$ is calculated. When $S_{wv}=0$ then $\text{Est}(\lambda_{postcat})=1$, otherwise $\text{Est}(\lambda_{postcat})=N(\phi)+1$.

Est ($\lambda_{postcat}$) and the measured $\lambda_{postcat}$ are compared, and the difference between them is used to update the coefficients $a_i$ of the oxygen storage characteristic curve $N(\phi)$ and the $\phi$ value itself so that the model 1 more accurately represents the performance of the catalyst 2. The coefficients $a_i$ are updated using a Kalman, filter, a description of which may be found in "Applied Optimal Estimation", Gelb, the MIT press 1974.

FIG. 2 illustrates the differing $N(\phi)$ curves for a good catalyst compared with a deteriorated catalyst.

Figure 3:
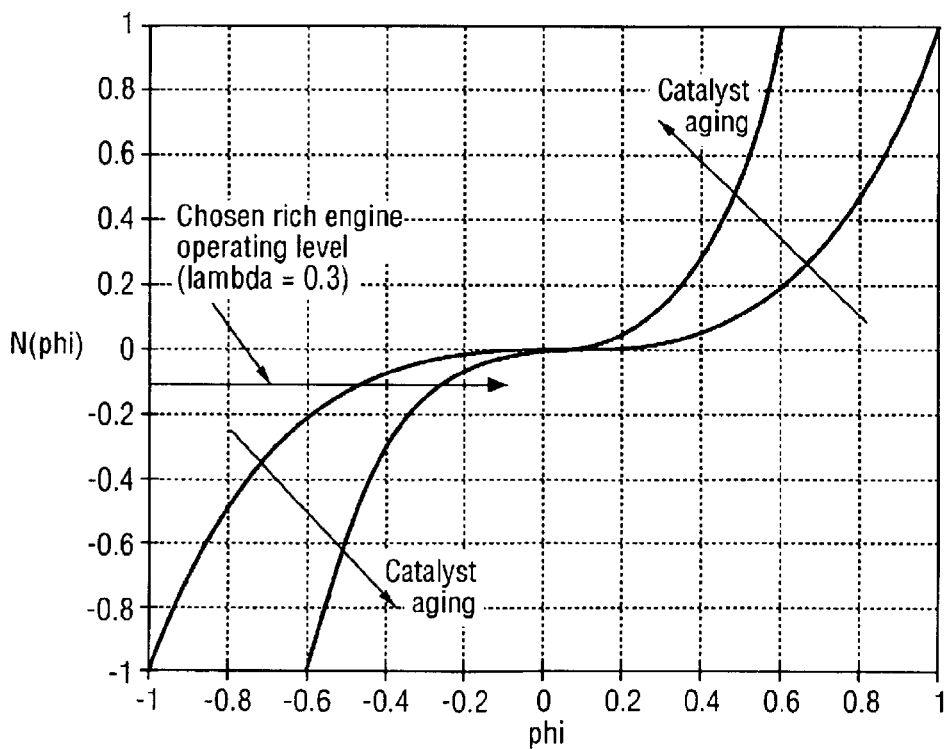
FIG. 3 is a graph showing how catalyst characteristics change with age of the catalyst.

After the engine has been operating at a particular air fuel ratio for some time, then the oxygen stored in the catalyst will stabilise at a value which depends upon the operating air-fuel ratio, thus $d\phi/dt=0$ and $\Delta\lambda_{precat}=\Delta\lambda_{postcat}$ FIG. 3 illustrates an example oxygen storage characteristic curve showing the oxygen storage value when $\Delta\lambda_{precat}=\Delta\lambda_{postcat}=0.1$ and when $\Delta\lambda_{precat}=\Delta\lambda_{postcat}=-0.1$. FIG. 3 illustrates how an oxygen storage characteristic curve may change for a deteriorated catalyst. The difference in the steady state oxygen storage value is illustrated for $\Delta\lambda_{precat}=\Delta\lambda_{postcat}=-0.1$ for two examples of oxygen storage characteristic curves. Hence it will be appreciated that if fuel control is implemented using air fuel ratio thresholds measured at the sensors 6, 7, then as the catalyst deteriorates, the fuel control scheme will allow breakthrough of $NO_x$ when the catalyst resists absorption of any more oxygen, and breakthrough of HC and CO when the catalyst is depleted of oxygen.

Therefore, in an improved fuel control scheme fuel control is achieved using the oxygen storage value $\phi$ which is estimated using the model 1 as described above. However, there are two reasons why $\phi$ may not be used directly to control the air fuel ratio demand of the engine. Firstly, there is a time delay between changing the air fuel ratio demand, and the resulting change in $\phi$ which means that if the air fuel ratio demand is changed due to $\phi$ reaching a predetermined threshold then that predetermined threshold will be exceeded, or 'overshot', due to the time delay. Secondly, as the catalyst ages, as shown in FIG. 3, the engine has to be run leaner to achieve a predetermined level of oxygen storage in the catalyst, and has to be run richer to achieve a predetermined level of oxygen depletion. Therefore, a predetermined threshold may only be reached by $\phi$ after breakthrough of $NO_x$, or HC and CO has already occurred, in fact for an extremely aged catalyst the predetermined threshold may never be reached, and the fuel control scheme would cease to switch air fuel ratio demand at all.

To alleviate the problem of the time delay, in this embodiment of the invention, a future $\phi$ is predicted, as will be described shortly with reference to FIG. 4, and this predicted $\phi$ is used to trigger switching of the air fuel ratio requested. In other embodiments of the invention the threshold $\phi$ may simply be set to have a smaller magnitude so that switching is triggered before the maximum desired $\phi$ is reached, in order to overcome the problem of overshooting the maximum desired $\phi$.

Figure 4:
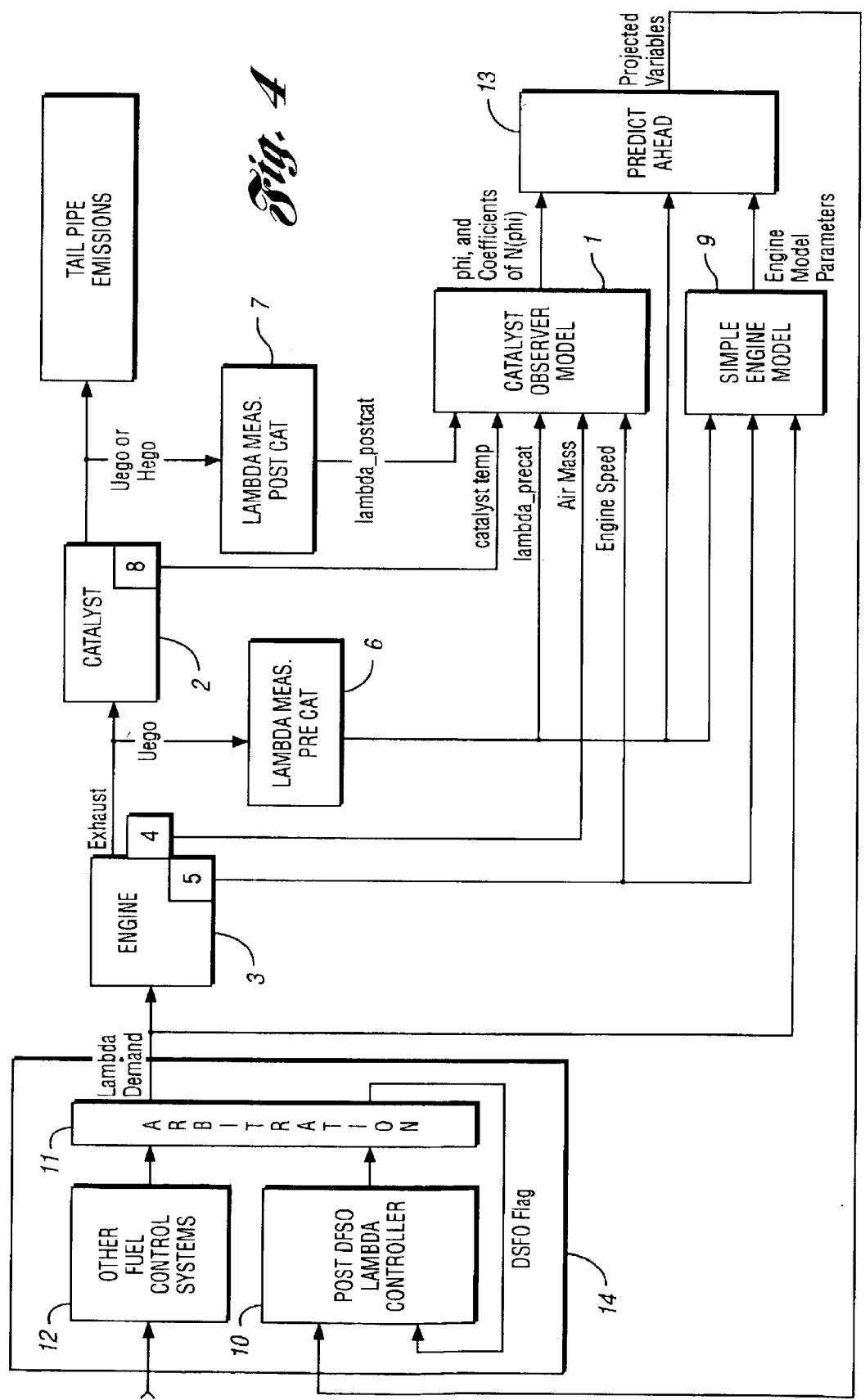
FIG. 4 is a block diagram illustrating an apparatus for implementing the fuel control scheme according to one embodiment of the invention.

FIG. 4 illustrates a fuel controller 14 which sends an air fuel ratio request to the engine 3 in dependence upon an estimated future oxygen storage value received from an oxygen storage predictor 13. Features of FIG. 14 which are equivalent to features of FIG. 1 are labelled with like numerals.

The oxygen storage predictor 13 uses values of $\phi$ and coefficients of $N(\phi)$, received from the catalyst model 1, along with data from an engine model 9 to predict a value for φ a short time in the future. The engine model 9 receives the air fuel ratio request from the fuel controller 14, an engine speed signal, which is measured by an engine speed sensor 5, and the air fuel ratio measured by the sensor 6, upstream of the catalyst 2. The engine model 9 predicts a likely future upstream air fuel ratio based on the current upstream air fuel ratio, the air fuel ratio request and the engine speed. The likely future upstream air fuel ratio is used by the oxygen storage predictor 13, together with values of φ and coefficients of N(φ) received from the catalyst model 1 to generate a prediction of φ ($\phi_{pred}$) a short time in the future.

Figure 5:
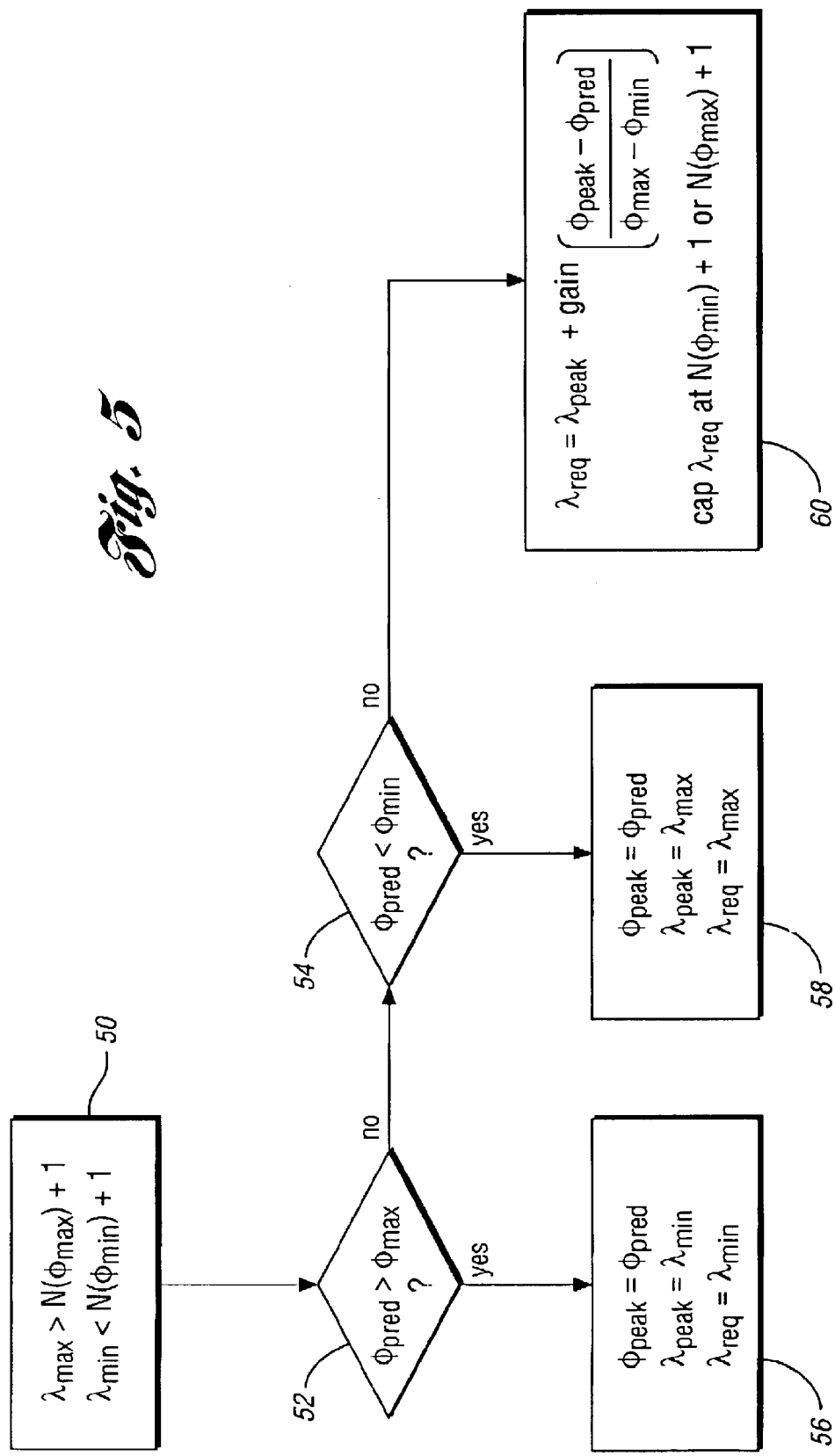
FIG. 5 is a flow chart illustrating the steps which are performed in the method in one embodiment of the invention.

A controller 10 receives $\phi_{pred}$ from the oxygen storage predictor 13 and generates an air fuel ratio request according to the steps illustrated in the flow chart of FIG. 5. $\phi_{pred}$ is used as a switching value to determine when to switch from a lean air fuel request to a rich air fuel request and vice versa.

At step 50 the maximum and minimum λ ($\lambda_{max}$ and $\lambda_{min}$) are set to predetermined maximum and minimum values respectively. $\lambda_{max}$ is set to a predetermined value greater than N($\phi_{max}$)+1 and $\lambda_{min}$ is set to a predetermined value less than N($\phi_{min}$)+1.

At step 52 the received prediction of φ ($\phi_{pred}$) is compared with the first threshold $\phi_{max}$. If $\phi_{pred}$ is greater than $\phi_{max}$ then this means that the air fuel mixture is becoming too lean, in which case step 56 is performed. Otherwise $\phi_{pred}$ is compared with the second threshold $\phi_{min}$ at step 54. If $\phi_{pred}$ is less than $\phi_{min}$ then this means the air fuel mixture is becoming too rich, in which case step 58 is performed. If the air fuel mixture is becoming neither too rich nor too lean then step 60 is performed.

Figure 6A:
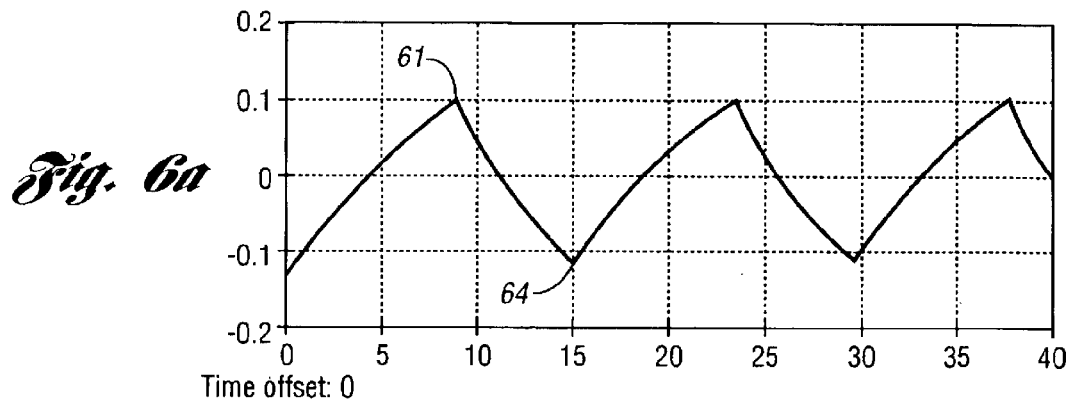
FIGS. 6a to 6d are graphs illustrating how various parameters vary when the method of the flowchart of FIG. 5 is implemented.
Figure 6B:
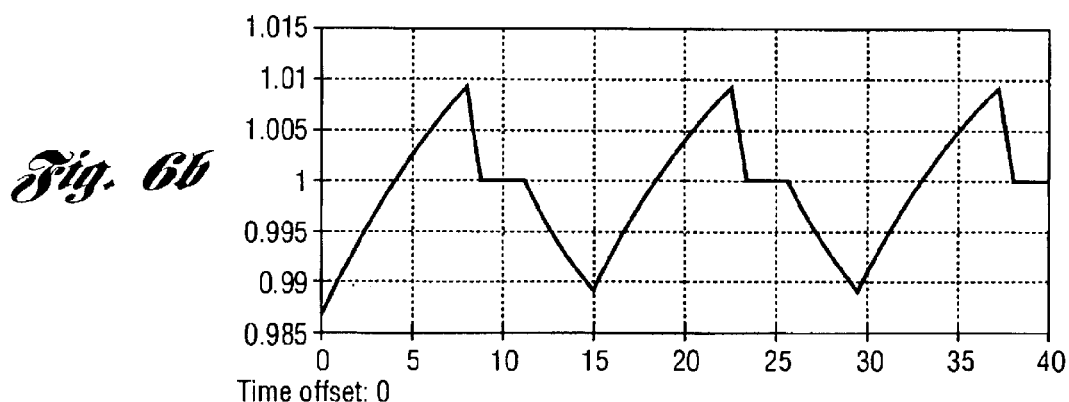
Figure 6C:
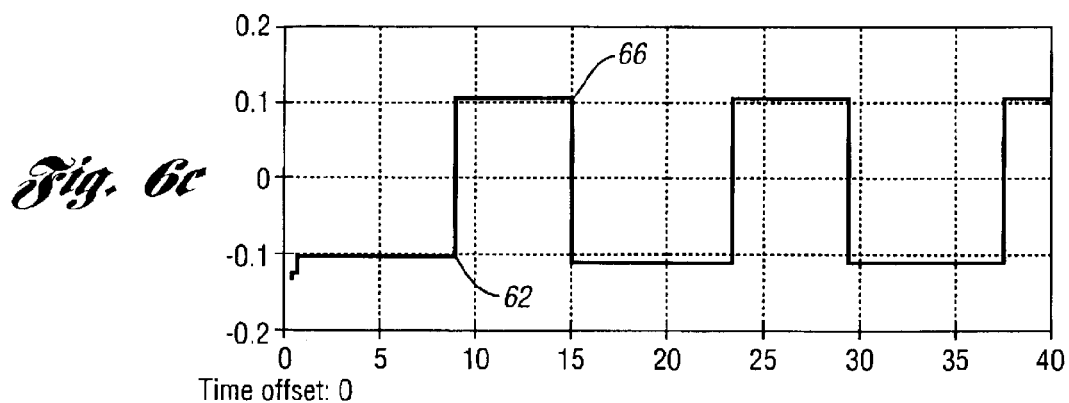
Figure 6D:
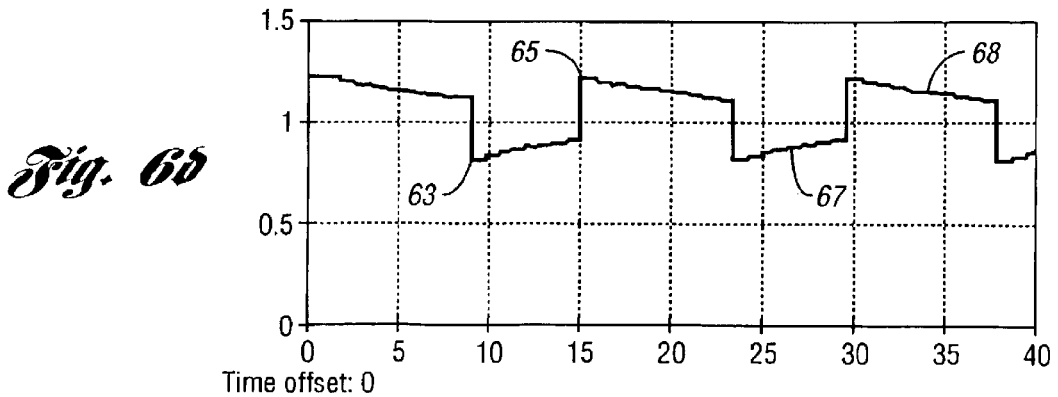

FIG. 6a illustrates variation of $\phi_{pred}$, FIG. 6b illustrates corresponding variation of Est ($\lambda_{postcat}$), FIG. 6c illustrates the resulting effect on $\phi_{peak}$, and FIG. 6d illustrates the resulting $\lambda_{req}$.

Dealing firstly with the case where the air fuel mixture is becoming too lean i.e. at point 61 where $\phi_{pred}$ is greater than $\phi_{max}$. At step 56 the air fuel ratio request $\lambda_{req}$ is set to $\lambda_{min}$, illustrated at point 63, which is the richest air fuel mixture which may be requested. $\lambda_{peak}$ is also set to $\lambda_{min}$, $\lambda_{peak}$ is used to record the peak λ request from which the next $\lambda_{req}$ will be calculated at step 60. $\phi_{peak}$ is set to be equal to $\phi_{pred}$, illustrated at point 62, $\phi_{peak}$ is used to record a peak φ value from which the next $\lambda_{req}$ will be calculated at step 60.

Secondly, when the air fuel is becoming too rich i.e. $\phi_{pred}$ is less than $\phi_{min}$, illustrated at point 64. At step 58 the air fuel ratio request $\lambda_{req}$ is set to $\lambda_{max}$, illustrated at point 65 which is the leanest air fuel mixture which may be requested. $\lambda_{peak}$ is also set to $\lambda_{max}$, $\lambda_{peak}$ is used to record the peak λ request from which the next $\lambda_{req}$ will be calculated at step 60. $\phi_{peak}$ is set to be equal to $\phi_{pred}$, illustrated at point 66, $\phi_{peak}$ is used to record a peak φ value from which the next $\lambda_{req}$ will be calculated at step 60.

Finally, if the mixture is becoming neither too rich nor too lean i.e. $\phi_{min} \leq \phi \leq \phi_{max}$, then step 60 is preformed. The air fuel ratio request $\lambda_{req}$ is either decreased or increased from the peak request $\lambda_{peak}$ depending upon a gain value, on the recorded value $\phi_{peak}$ and upon $\phi_{pred}$. Increasing $\lambda_{req}$ from a minimum peak value is illustrated by a section of FIG. 6d labelled 67. Decreasing $\lambda_{req}$ from a maximum peak value is illustrated by a section of FIG. 6d labelled 68.

The difference between $\phi_{peak}$ and $\phi_{pred}$ is calculated. If $\phi_{peak}$ is equal to $\phi_{max}$ then this difference will be a positive value, and $\lambda_{peak}$ will be equal to $\lambda_{min}$. It follows that $\lambda_{req}$ will be equal to $\lambda_{min}$ plus the difference between $\phi_{max}$ and $\phi_{pred}$ normalised by the maximum possible difference ($\phi_{max}-\phi_{min}$) and multiplied by a gain value. Therefore in this case $\lambda_{req}$ is increasing from the minimum possible air fuel ratio request in dependence upon the difference between the predicted oxygen storage value and the predetermined maximum oxygen storage value.

If $\phi_{peak}$ is equal to $\phi_{min}$ then this difference will be a negative value, and $\lambda_{peak}$ will be equal to $\lambda_{max}$. It follows that $\lambda_{req}$ will be equal to $\lambda_{max}$ minus the difference between $\phi_{pred}$ and $\phi_{min}$ normalised by the maximum possible difference ($\phi_{max}-\phi_{min}$) and multiplied by a gain value. Therefore in this case $\lambda_{req}$ is decreasing from the maximum possible air fuel ratio request in dependence upon the difference between the predicted oxygen storage value and the predetermined minimum oxygen storage value. $\lambda_{req}$ is then capped at N($\phi_{min}$)+1 or N($\phi_{max}$)+1 appropriately.

To alleviate the problem of changing φ as the catalyst ages, in other embodiments of the invention, instead of controlling air fuel ratio demand using a predetermined threshold of φ, the air fuel ratio may be controlled using a predetermined threshold of N(φ). The result is that a predetermined threshold of N(φ) results in a threshold of φ which decreases in magnitude as the catalyst ages. Other techniques may of course be used to decrease this threshold as the catalyst ages.

In some exhaust systems there are two catalysts in series, each being capable of storing and releasing oxygen. In such systems, the air fuel ratio request may be controlled in dependence upon the oxygen storage state of both catalysts. Otherwise it could occur that the downstream catalyst is full of oxygen and is unable to remove $NO_x$ emissions from the upstream catalyst.

What is claimed is:

1. A fuel control system for monitoring engine exhaust of a vehicle having a catalyst, said system comprising
   a first sensor arranged to measure an air fuel ratio upstream of the catalyst;
   a second sensor arranged to measure an air fuel ratio downstream of the catalyst;
   a catalyst model arranged to determine oxygen storage characteristics of the catalyst, the catalyst model further being arranged to estimate an oxygen storage value of the catalyst in dependence upon the measured air fuel ratio upstream of the catalyst, upon the measured air fuel ratio downstream of the catalyst, and upon the determined oxygen storage characteristics of the catalyst;
   an oxygen storage predictor arranged to determine a future oxygen storage value of the catalyst in dependence on the estimated oxygen storage value and a predicted future air fuel ratio;
   a controller adapted to request an air fuel ratio according to a switching value derived from the future estimated oxygen storage value, in which the controller is arranged to perform the following steps
   a) request a maximum ratio of air to fuel when the switching value is less than a first threshold;
   b) gradually decrease the requested air to fuel ratio from said maximum ratio;
   c) request a minimum ratio of air to fuel when the switching value is greater than a second threshold; and
   d) gradually increase the requested air to fuel ratio from said minimum ratio.

2. A fuel control system for monitoring engine exhaust of a vehicle having a catalyst, said system comprising
   a first sensor arranged to measure an air fuel ratio upstream of the catalyst;

a second sensor arranged to measure an air fuel ratio downstream of the catalyst;

a catalyst model arranged to determine oxygen storage characteristics of the catalyst, the catalyst model further being arranged to estimate an oxygen storage value of the catalyst in dependence upon the measured air fuel ratio upstream of the catalyst, upon the measured air fuel ratio downstream of the catalyst, and upon the determined oxygen storage characteristics of the catalyst;

an oxygen storage predictor arranged to provide the switching value to the controller, wherein the oxygen storage predictor estimates a future oxygen storage value of the catalyst in dependence upon the estimated oxygen storage value, the determined oxygen storage characteristics, and a requested air fuel ratio, and derives the switching value from the estimated future oxygen storage value; and a controller adapted to request an air fuel ratio according to a switching value derived from the estimated oxygen storage value of the catalyst, in which the controller is arranged to perform the following steps:
 a) request a maximum ratio of air to fuel when the switching value is less than a first threshold;
 b) gradually decrease the requested air to fuel ratio from said maximum ratio;
 c) request a minimum ratio of air to fuel when the switching value is greater than a second threshold; and
 d) gradually increase the requested air to fuel ratio from said minimum ratio.

3. A fuel control system according to claim 2, wherein the oxygen storage predictor is arranged to derive the switching value from the estimated future oxygen storage value in dependence upon the oxygen storage characteristics.

4. A fuel control system according to claim 1 wherein the rate of decrease in step b) is dependant upon the difference between the switching value and the first threshold and the rate of increase in step d) is dependent upon the difference between the switching value and the second threshold.

5. A fuel control system according to claim 2 wherein the rate of decrease in step b) is dependant upon the difference between the switching value and the first threshold and the rate of increase in step d) is dependent upon the difference between the switching value and the second threshold.

6. A fuel control system according to claim 3 wherein the rate of decrease in step b) is dependant upon the difference between the switching value and the first threshold and the rate of increase in step d) is dependent upon the difference between the switching value and the second threshold.

7. A method of requesting an air fuel ratio according to a future estimated oxygen storage value of a catalyst comprising the steps of
 a) deriving a switching value from the future estimated oxygen storage value;
 b) requesting a maximum ratio of air to fuel when the switching value is less than a first threshold;
 c) gradually decreasing the requested air to fuel ratio from said maximum ratio;
 d) requesting a minimum ratio of air to fuel when the switching value is greater than a second threshold; and
 e) gradually increasing the requested air to fuel ratio from said minimum ratio.

8. A method of requesting an air to fuel ratio according to a switching value derived from an estimated oxygen storage value of a catalyst comprising the steps of:
 a) deriving the switching value from an estimated future oxygen storage value, in which the estimated future oxygen storage value of the catalyst is estimated in dependence upon the estimated oxygen storage value, determined oxygen storage characteristics, and a requested air fuel ratio;
 b) requesting a maximum ratio of air to fuel when the switching value is less than a first threshold;
 c) gradually decreasing the requested air to fuel ratio from said maximum ratio;
 d) requesting a minimum ratio of air to fuel when the switching value is greater than a second threshold; and
 e) gradually increasing the requested air to fuel ratio from said minimum ratio.

9. A method according to claim 8, in which the switching value is derived from the estimated future oxygen storage value in dependence upon said oxygen storage characteristics.

10. A fuel control system according to claim 7 wherein the rate of decrease in step b) is dependant upon the difference between the switching value and the first threshold and the rate of increase in step d) is dependent upon the difference between the switching value and the second threshold.

11. A fuel control system according to claim 8 wherein the rate of decrease in step b) is dependant upon the difference between the switching value and the first threshold and the rate of increase in step d) is dependent upon the difference between the switching value and the second threshold.

12. A fuel control system according to claim 9 wherein the rate of decrease in step b) is dependant upon the difference between the switching value and the first threshold and the rate of increase in step d) is dependent upon the difference between the switching value and the second threshold.

* * * * *